(12) United States Patent
Byeung Woo et al.

(10) Patent No.: US 8,446,949 B2
(45) Date of Patent: May 21, 2013

(54) DISTRIBUTED CODED VIDEO DECODING APPARATUS AND METHOD CAPABLE OF SUCCESSIVELY IMPROVING SIDE INFORMATION ON THE BASIS OF RELIABILITY OF RECONSTRUCTED DATA

(75) Inventors: Jeon Byeung Woo, Seongnam-si (KR); Ko Bong Hyuck, Jeju-si (KR)

(73) Assignee: Sungkyunkwan University Foundation for Corporate Collaboration, Suwon-Si (KR)

( * ) Notice: Subject to any disclaimer, the term of this patent is extended or adjusted under 35 U.S.C. 154(b) by 1122 days.

(21) Appl. No.: 12/392,168

(22) Filed: Feb. 25, 2009

(65) Prior Publication Data

US 2009/0316797 A1    Dec. 24, 2009

(30) Foreign Application Priority Data

Jun. 23, 2008  (KR) .................. 10-2008-0058764
Jan. 28, 2009  (KR) .................. 10-2009-0006641

(51) Int. Cl.
*H04N 7/12*    (2006.01)

(52) U.S. Cl.
USPC ............... 375/240.1; 375/240.03; 375/240.25

(58) Field of Classification Search
CPC ................................. H04N 7/50; H03M 13/00
USPC .................................................. 375/240–241
See application file for complete search history.

(56) References Cited

U.S. PATENT DOCUMENTS

2008/0031344 A1*  2/2008  Lu et al. ................... 375/240.19
2008/0291065 A1*  11/2008  Lu et al. ........................ 341/107

OTHER PUBLICATIONS

A.B.B. Adikari et al, Sequencial motion estimation using luminance and chrominance information for distributed video coding of Wyner-Ziv frames, IEEE, Electronic Letters, vol. 42, No. 7, Mar. 30, 2006,.
Bonghyuck Ko et al, Transform domain Wyner-Ziv video coding with successively improving side information based on decoding reliability, Journal of Korea Society of Broadcast Engineers, vol. 13, No. 6, 2008.

* cited by examiner

*Primary Examiner* — Ricky Ngo
*Assistant Examiner* — Wei-Po Kao
(74) *Attorney, Agent, or Firm* — Lexyoume IP Meister, PLLC.

(57) ABSTRACT

A distributed coded video decoding apparatus includes a key picture decoding unit for reconstructing a key picture, a side information generation unit for generating side information using the key picture and/or previously reconstructed WZ pictures, a side information update unit for updating the side information using the side information and corrected reconstructed video, a channel code decoding unit for decoding quantization symbols, a video reconstruction unit for reconstructing a current WZ picture using the quantization symbols and the side information, and a video correction unit for calculating the reconstructed data reliability using channel code decoded data reliability of the decoded data and/or the reconstructed video reliability determining whether to correct the reconstructed video and determining a correction value based on the calculated the reconstructed data reliability and then correcting the reconstructed video.

26 Claims, 16 Drawing Sheets

DISTRIBUTED CODED VIDEO DECODING APPARATUS AND METHOD CAPABLE OF SUCCESSIVELY IMPROVING SIDE INFORMATION ON THE BASIS OF RELIABILITY OF RECONSTRUCTED DATA

BACKGROUND OF THE INVENTION

1. Field of the Invention

The present invention relates generally to a distributed coded video decoding apparatus and method capable of successively improving side information on the basis of the reliability of reconstructed data, and, more particularly, to a distributed coded video decoding apparatus and method capable of successively improving side information on the basis of the reliability of reconstructed data, which measure the reliability of the reconstructed data, determine whether the side information can be improved based on the reconstruction results, and update the side information depending on the determination, thereby successively improving rate-distortion performance.

2. Description of the Related Art

Since digital video data used in video conferencing, Video On Demand (VOD) receivers, digital broadcast receivers and Cable Television (CATV) generally is of a considerable data size, it is common to compress the data using an efficient compression method rather than using it in unchanged form.

Technologies for compressing video include compression standards such as MPEG and H.26×. These technologies have been used for many applications such as video players, VOD, video telephony and Digital Multimedia Broadcasting (DMB), and are being currently used for the transmission of video in a wireless mobile base due to the development of 2.5G/3G wireless communications.

Digital video data is compressed chiefly using three methods, that is, a method of reducing temporal redundancy, a method of reducing spatial redundancy and a method of reducing the statistical redundancy of occurring codes. A representative method of reducing temporal redundancy is the technology for motion estimation and compensation.

Although current coding technologies achieve high coding efficiency by eliminating such temporal redundancy, a reduction in the complexity of a coder in a limited resource environment like that of a sensor network has become an important technological issue because the portion of a video coder that generates the largest amount of computational load is also a motion tracking and compensation technology.

Distributed Source Coding (DSC) technology based on the Slepian-Wolf theorem is attracting attention as a method for solving the coder complexity problem. The Slepian-Wolf theorem mathematically proves that, if correlated sources are independently coded and decoded jointly, coding gain equal to that obtained by performing predictive coding on respective sources together can be achieved.

Distributed Video Coding (DVD) technology was established by extending distributed source coding technology, which was applied to lossless compression, to the case of lossy compressing, and is also based on Wyner-Ziv theory established by extending Slepian-Wolf theory, which is the theoretical basis of distributed source coding technology, to the case of lossy coding. From the point of view of video coding technology, these two technologies imply that it is possible to move all prior art motion estimation and compensation procedures performed so as to reduce inter-picture redundancy to a decoder side without the particular loss of coding gain.

Of distributed video coding technologies, Wyner-Ziv coding technology based on the paper "Wyner-Ziv coding for video: applications to compression and error resilience" published by A. Aaron, S. Rane, R. Zhang and B. Girod in Proc. IEEE Data Compression Conference, 2003 is well known. In this distributed video coding technology, the side information for a current picture is generated by a decoder using the similarity between neighboring pictures, this side information is configured in such a way that the noise of a virtual channel is added to a current picture to be reconstructed, and the current picture is reproduced by eliminating the noise from the side information using parity bits transmitted from a coder.

FIG. 1 is a diagram showing the construction of a coder 110 and a corresponding decoder 130 based on prior art Wyner-Ziv coding technology.

As shown in FIG. 1, the coder 110 based on the prior art Wyner-Ziv coding technology includes a key picture encoding unit 114, a quantization unit 111, a block segmentation unit 112, and a channel code encoding unit 113. The decoder 130 corresponding to the coder 110 includes a key picture decoding unit 133, a channel code decoding unit 131, a side information generation unit 134, and a video reconstruction unit 132.

The coder 110 based on Wyner-Ziv coding technology classifies pictures to be coded into two types. One type of picture is pictures to be coded using a distributed video coding method (hereinafter referred to as 'WZ pictures'), and the other type of pictures are pictures to be coded using a prior art coding method rather than the distributed video coding method (hereinafter referred to as 'key pictures').

Key pictures are generally coded by the key picture encoding unit 114 using a method, such as an H.264/AVC intra-picture coding method, selected by a user, and are then transmitted to the decoder 130. The key picture decoding unit 133 of the decoder 130 corresponding to the coder 110 based on the prior art Wyner-Ziv coding technology reconstructs the key pictures that are coded using the predetermined method and then transmitted, and the side information generation unit 134 generates side information corresponding to WZ pictures using the key pictures that are reconstructed by the key picture decoding unit 133.

In general, the side information generation unit 134 generates side information corresponding to a WZ picture to be reconstructed using interpolation that assumes the presence of linear motion between key pictures disposed beside the WZ picture. Although extrapolation may be used in some cases, interpolation is used in most cases because interpolation is superior to extrapolation from the point of view of performance.

Meanwhile, in order to code a WZ picture, the quantization unit 111 of the coder 110 quantizes the WZ picture, and the block segmentation unit 112 divides the quantized WZ picture into predetermined decoding units. Furthermore, the channel encoding unit 113 generates parity bits for respective encoding units using channel codes.

The generated parity bits are stored in a parity buffer (not shown), and are then transmitted sequentially via a feedback channel, that is, a feedback channel, at the request of the decoder 130. The channel code decoding unit 131 of FIG. 1 estimates quantization symbols with reference to the side information and the parity bits transmitted by the coder 110. The video reconstruction unit 132 of FIG. 1 receives the quantization symbols estimated by the channel code decoding unit 131, inverse-quantizes the quantization symbols, and plays back the reconstructed WZ picture.

In the above process, ambiguity occurring during inverse quantization is handled with reference to the side information input by the side information generation unit 134.

Basically, the decoding method of Wyner-Ziv coding technology is to correct the noise of the side information using the channel code. However, since the encoder does not have channel information, it is hard to know the number of required parity bits to correct the noise, with the result that the decoder is configured to successively request parity bits from the encoder via the feedback channel. For a detailed description thereof, refer to the paper "Wyner-Ziv coding for video: applications to compression and error resilience," published by A. Aaron, S. Rane, R. Zhang, and B. Girod in Proc. IEEE Data Compression Conference, 2003.

In the meantime, the feedback channel-based decoding method of the Wyner-Ziv coding technology has the advantage of enabling the update of side information using the results of each decoding process. For a detailed description thereof, refer to the paper "Motion compensated refinement for low complexity pixel based distributed video coding," published by J. Ascenso, C. Brites, and F. Pereira in Proc. of IEEE International Conference on Advanced Video and Signal Based Surveillance, 2005 and the paper "Embedded side information refinement for pixel domain Wyner-Ziv video coding towards UMTS 3G application," published by Z. Xue, K. K. Loo, and J. Cosmas in Proc. of IEEE Intern. Conf. on Multimedia and Expo, 2007.

However, the method of updating side information using reconstruction results is limited to the case where the reliability of reconstructed data is sufficiently high. If not, this method has a problem in that the quality of side information is continuously deteriorated.

In the Wyner-Ziv decoding process, since the most energy of a WZ picture is reconstructed through the decoding of the channel code in order to obtain reconstructed data with sufficiently high reliability, the reliability of the decoding results of the channel code must be sufficiently high. However, if a large number of channel code decoding errors have occurred because of a large amount of noise in the side information or lack of received parity bits, the reliability of data decoded by the channel code decoding unit (hereinafter referred to as the 'channel code decoded data reliability') and the reliability of video reconstructed by the video reconstruction unit (hereinafter referred to as the 'reconstructed video reliability') are considerably low. Accordingly, in the case where it is hard to generate accurate side information since key pictures have large numbers of quantization errors or the motion between pictures is complex or fast, the problem of the continuous deterioration of the quality of side information becomes more serious.

As a result, the technology for measuring the reliability of reconstructed data, determining whether side information can be improved based on the reconstruction results, and successively improving side information depending on the determination, thereby improving rate-distortion performance, is strongly needed.

SUMMARY OF THE INVENTION

Accordingly, the present invention has been made keeping in mind the above problems occurring in the prior art, and an object of the present invention is to provide a distributed coded video decoding apparatus and method capable of successively improving side information on the basis of the reliability of reconstructed data, which determine the reliability of reconstructed data using the decoding results of the channel code and/or additional information received from an encoding apparatus and/or temporal and spatial picture similarity available for the decoding apparatus, selectively correct reconstructed video, and update the corrected video as new side information.

In order to accomplish the above object, the present invention provides a distributed coded video decoding apparatus, including a key picture decoding unit for reconstructing at least one key picture transmitted from an encoding apparatus; a side information generation unit for generating side information using at least one of the key pictures reconstructed by the key picture decoding unit and/or previously reconstructed WZ pictures; a side information update unit for updating the side information using the side information generated by the side information generation unit and reconstructed video corrected by a video correction unit; a channel code decoding unit for decoding quantization symbols using parity bits transmitted from the encoding apparatus and the side information received from the side information update unit; a video reconstruction unit for reconstructing a current WZ picture, that is a decoding target, using the quantization symbols decoded by the channel code decoding unit and the side information from the side information update unit; and a video correction unit for calculating reliability of the reconstructed data using at least one of channel code decoded data reliability from the channel code decoding unit and the reconstructed video reliability from the video reconstruction unit, determining whether to correct the reconstructed video and determining a correction unit, a unit applying the correction, based on the calculation, and then correcting the reconstructed video using the picture similarity.

Here, the video correction unit may include a reconstructed data reliability measurement unit for calculating the reliability of reconstructed data by measuring at least one of the channel code decoded data reliability and the reconstructed video reliability; a reconstructed video correction determination unit for determining whether to correct the reconstructed video and determining a correction value based on the reconstructed data reliability; and a correction unit for correcting the reconstructed video using temporal and spatial picture similarity.

Furthermore, the reconstructed data reliability measurement unit may include at least one of a channel code decoded data reliability measurement unit for measuring the reliability of decoded data from the channel code decoding unit and a reconstructed video reliability measurement unit for measuring the reliability of the reconstructed video from the video reconstruction unit; and a reconstructed data reliability calculation unit for calculating the reliability of the reconstructed data using at least one of the channel code decoded data reliability and the reconstructed video reliability.

The channel code decoded data reliability measurement unit may measure the channel code decoded data reliability using soft output of channel code and/or additional information received from the encoding apparatus, such as CRC.

Furthermore, the reconstructed video reliability measurement unit may measure the reliability of the reconstructed video based on temporal similarity between a specific pixel in the reconstructed current WZ picture and/or a corresponding pixel in the side information and/or a corresponding pixel in key pictures and/or a corresponding pixel in previous WZ pictures, and/or spatial similarity between the specific pixel and its neighboring pixels within the reconstructed current WZ picture.

Meanwhile, the reconstructed video correction determination unit may include a correction determination unit for determining whether to correct reconstructed video, and a correction unit determination unit for determining a correction unit.

Here, the correction determination unit may determine whether to correct the reconstructed video by using preliminary obtained statistical information, or may determine whether to correct the reconstructed video by trial and error method, that is first correcting the reconstructed video and then evaluating the correction based on the reliability of the result. Alternatively, the correction determination unit may determine whether to correct the reconstructed video by using a combination of the above two methods.

The correction unit determination unit may determine the correction unit so that the correction can be applied for a unit of each pixel and/or a unit of each block and/or a unit of entire picture.

The correction unit may include at least one of a spatial candidate estimation unit for estimating a spatial candidate value based on spatial similarity between the correction target pixel and its neighboring pixels and a temporal candidate estimation unit for estimating a temporal candidate value based on temporal similarity between the correction target pixel and a corresponding pixel within at least one of the reconstructed key pictures, the previous WZ pictures and the side information; and a final correction unit for correcting the correction target pixel using at least one of the temporal candidate value and the spatial candidate value.

Here, the spatial candidate estimation unit may estimate the spatial candidate value to be a median value among the correction target pixel and its neighboring pixels.

The temporal candidate estimation unit may estimate the temporal candidate value through motion estimation for the reconstructed current WZ picture by using at least one of the reconstructed key pictures and/or the previous WZ pictures as a reference picture.

The final correction unit may correct all or part of value of the target pixel to be corrected based on the reliability of the reconstructed data thereof.

In order to accomplish the above object, the present invention provides a distributed coded video decoding method, including (a) a key picture decoding step of reconstructing key picture transmitted from an encoding apparatus; (b) a side information generation step of generating side information using at least one of the reconstructed key pictures and/or previously reconstructed WZ pictures; (c) a side information update step of updating the side information using the generated side information and corrected reconstructed video; (d) a channel code decoding step of decoding quantization symbols using parity bits transmitted from the encoding apparatus and the side information updated by the side information update unit; (e) a video reconstruction step of reconstructing a current WZ picture, that is the decoding target, using the decoded quantization symbols and the side information from the side information update step; (f) a reconstructed data reliability measurement step of calculating reliability of the reconstructed data using at least one of channel code decoded data reliability obtained at the channel code decoding step and reconstructed video reliability obtained at the video reconstruction step; (g) a reconstructed video correction determination step of determining whether to correct the reconstructed video and determining a correction value based on the calculation; and (h) a correction step of correcting the reconstructed video based on picture similarity.

Here, the step (f) may include at least one of a channel code decoded data reliability measurement step of measuring the reliability of decoded data from the channel code decoding unit and a reconstructed video reliability measurement step of measuring the reliability of the reconstructed video from the video reconstruction unit; and a reconstructed data reliability calculation step of calculating the reliability of the reconstructed data using at least one of the channel code decoded data reliability and the reconstructed video reliability.

Here, the channel code decoded data reliability measurement step may measure the channel code decoded data reliability using soft output of channel code and/or additional information received from the encoding apparatus, such as CRC.

Furthermore, the reconstructed video reliability measurement step may measure the reliability of the reconstructed video based on temporal similarity between a specific pixel in the reconstructed current WZ picture and/or a corresponding pixel in the side information and/or a corresponding pixel in key pictures and/or a corresponding pixel in previous WZ pictures, and/or spatial similarity between the specific pixel and its neighboring pixels thereof within the reconstructed current WZ picture.

Meanwhile, the step (g) may include a correction determination step of determining whether to correct reconstructed video, and a correction unit determination step of determining a correction unit.

Here, the correction determination step may determine whether to correct the reconstructed video by using preliminary obtained statistical information, or may determine whether to correct the reconstructed video by a trial and error method, that is, a method of first correcting the reconstructed video and then evaluating the correction based on the reliability of the result. Alternatively, the correction determination step may determine whether to correct the reconstructed video by using a combination of the above two methods.

Here, the correction unit determination step may determine the correction unit so that the correction can be applied for a unit of each pixel and/or a unit of each block and/or a unit of the entire picture.

Furthermore, the step (h) includes at least one of a spatial candidate estimation step of estimating a spatial candidate value based on spatial similarity between the correction target pixel and its neighboring pixels, and a temporal candidate estimation step of estimating a temporal candidate value based on temporal similarity between the correction target pixel and a corresponding pixel within at least one of the reconstructed key pictures, the previous WZ pictures and the side information; and a final correction step of correcting the correction target pixel using at least one of the temporal candidate value and the spatial candidate value.

Here, the spatial candidate value may be estimated to be a median value among the correction target pixel and its neighboring pixels.

Furthermore, the temporal candidate value may be estimated through motion estimation for the reconstructed current WZ picture by using at least one of the reconstructed key pictures and/or the previous WZ pictures as a reference picture.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
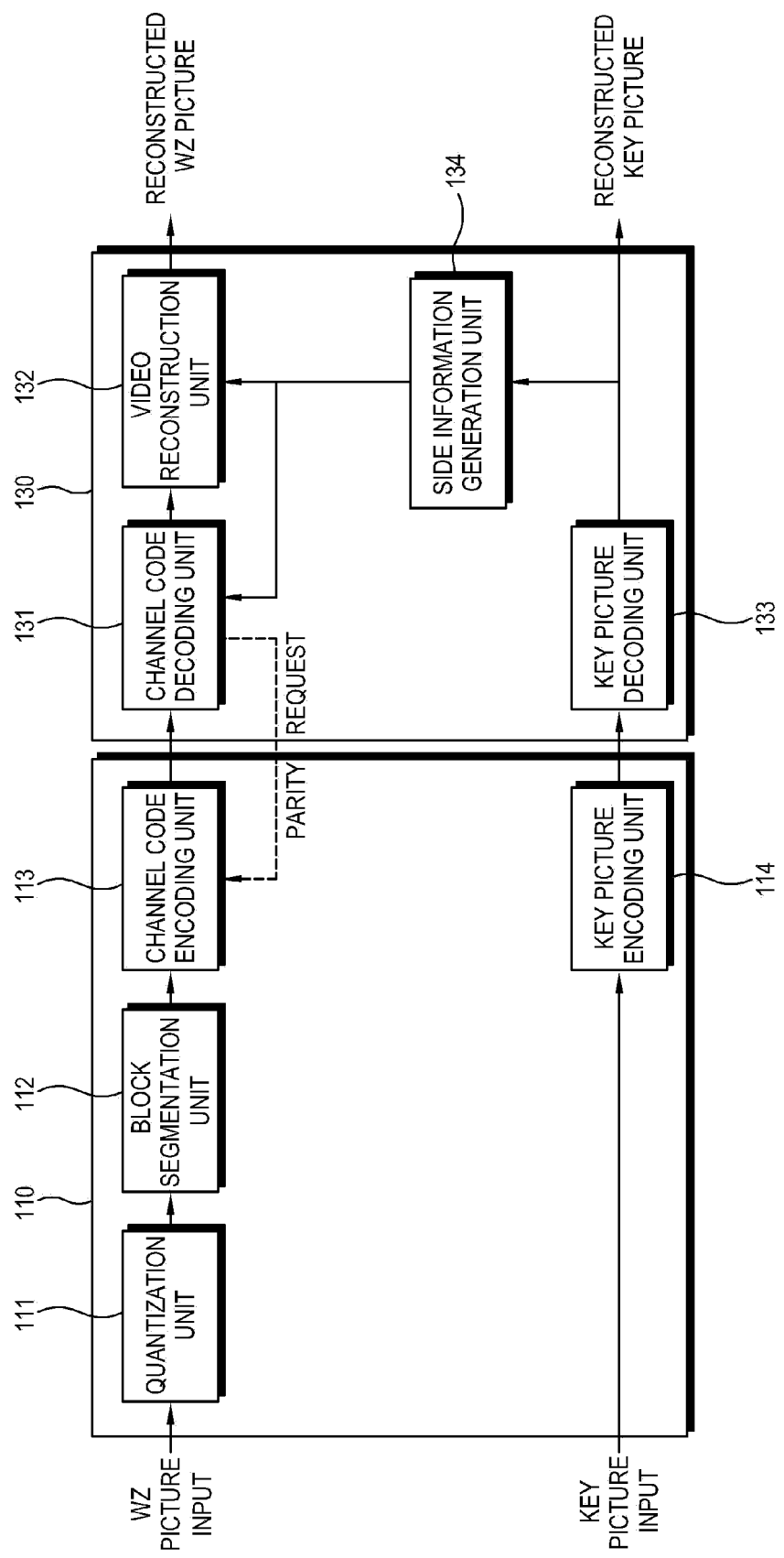
FIG. 1 is a diagram showing the construction of an encoder and corresponding decoder based on prior art Wyner-Ziv coding technology.

Reference now should be made to the drawings, in which the same reference numerals are used throughout the different drawings to designate the same or similar components.

The present invention will be described in detail below with reference to the accompanying drawings.

Figure 2:
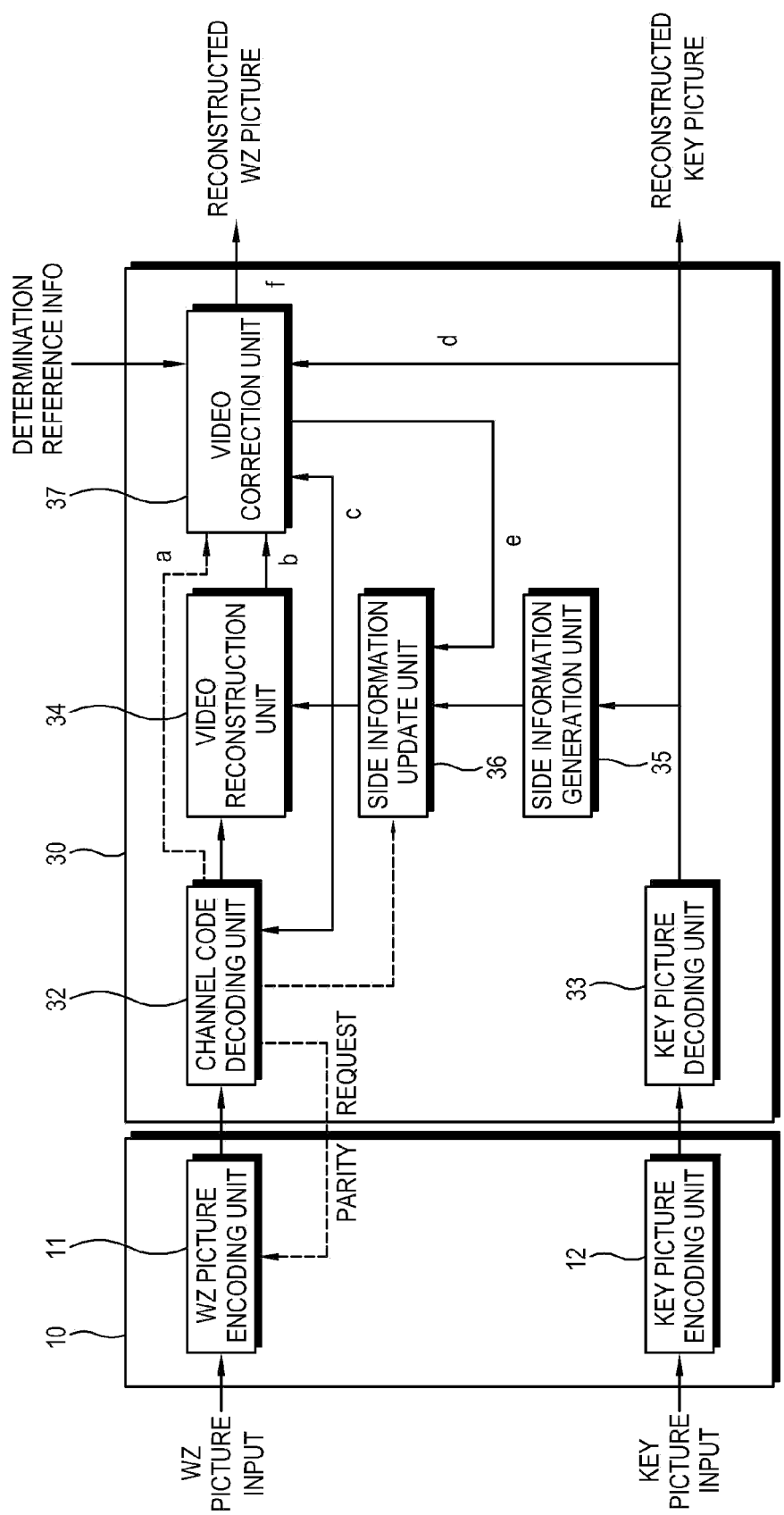
FIG. 2 is a diagram showing the construction of a Wyner-Ziv encoding apparatus and the construction of a distributed coded video decoding apparatus, in pixel domain, capable of successively improving side information on the basis of the reliability of reconstructed data, which includes reconstructed data reliability measurement and reconstructed video correction functions, according to the present invention.

FIG. 2 is a diagram showing the construction of a Wyner-Ziv encoding apparatus 10 and the construction of a distributed coded video decoding apparatus 30 capable of successively improving side information based on the reliability of reconstructed data, which includes reconstructed current WZ picture reliability measurement and reconstructed current WZ picture correction functions, according to the present invention.

Referring to FIG. 2, the Wyner-Ziv encoding apparatus 10 according to the present invention includes a key picture encoding unit 12 and a WZ picture encoding unit 11. Meanwhile, the decoding apparatus 30 according to the present invention includes a key picture decoding unit 33, a channel code decoding unit 32, a side information generation unit 35, a side information update unit 36, a video reconstruction unit 34 and a video correction unit 37.

The key picture decoding unit 33 reconstructs key pictures using the data received from key picture encoding unit 12, and the side information generation unit 35 generates side information for a current WZ picture to be reconstructed using the reconstructed key pictures and/or previous WZ pictures which are already reconstructed. Furthermore, the side information update unit 36 updates the side information from the generated side information and reconstructed current WZ picture corrected by the video correction unit 37.

The channel code decoding unit 32 decodes quantization symbols using both the side information from the side information update unit 36 and parity bits from the Wyner-Ziv encoding apparatus 10. Meanwhile, the video reconstruction unit 34 reconstructs the current WZ picture using both the quantization symbols decoded by the channel code decoding unit 32 and the side information received from the side information update unit 36.

Here, the reconstructed current WZ picture b reconstructed by the video reconstruction unit 34 is input to the video correction unit 37, and a video correction unit 37 measures the reliability of the reconstructed current WZ picture using the decoding results of the channel code decoding unit 32 and/or additional information 'a' received from the encoding apparatus, the side information 'c' from the side information update unit 36 and key pictures reconstructed by the key picture decoding unit 33 and/or previously reconstructed WZ pictures 'd', corrects reconstructed current WZ picture and updates as a new side information 'e', thereby successively improving the side information and then reconstructing a WZ picture 'f' having considerable improvement in quality while using only a smaller number of parity bits.

The channel code decoding unit 32 of FIG. 2 is configured to, if it determines that the estimation of reliable quantization symbols is difficult while performing channel code decoding, successively request and receive a parity bit from the Wyner-Ziv encoding apparatus 10 within a predetermined limit until reliable estimation is enabled.

The case is effective from the aspect of a reduction in bit rate because only required parities for decoding are received from the Wyner-Ziv encoding apparatus 10. This is possible only when a feedback channel through which a parity bit can be requested exists. Accordingly, when an excessive number of parity bits are requested, the number of executions of channel decoding is increased, so that there arise problems in that decoding complexity increases and the number of bits transmitted over the feedback channel increases. In order to alleviate this problem, the configuration may be designed so that a predetermined number of parity bits are previously transmitted to the decoding unit 30 at one time without requiring respective parity requests and a small number of parity bits may be additionally transmitted to eliminate the remaining noise.

Furthermore, it is preferable to use turbo code or Low-Density Parity Check (LDPC) code, which has been known to almost reach the Shannon limit, as the channel code used in the channel code decoding unit 32 of FIG. 2. Additionally, it will be apparent that other channel codes having excellent error correction capability and thus excellent compression efficiency may be used.

Figure 3:
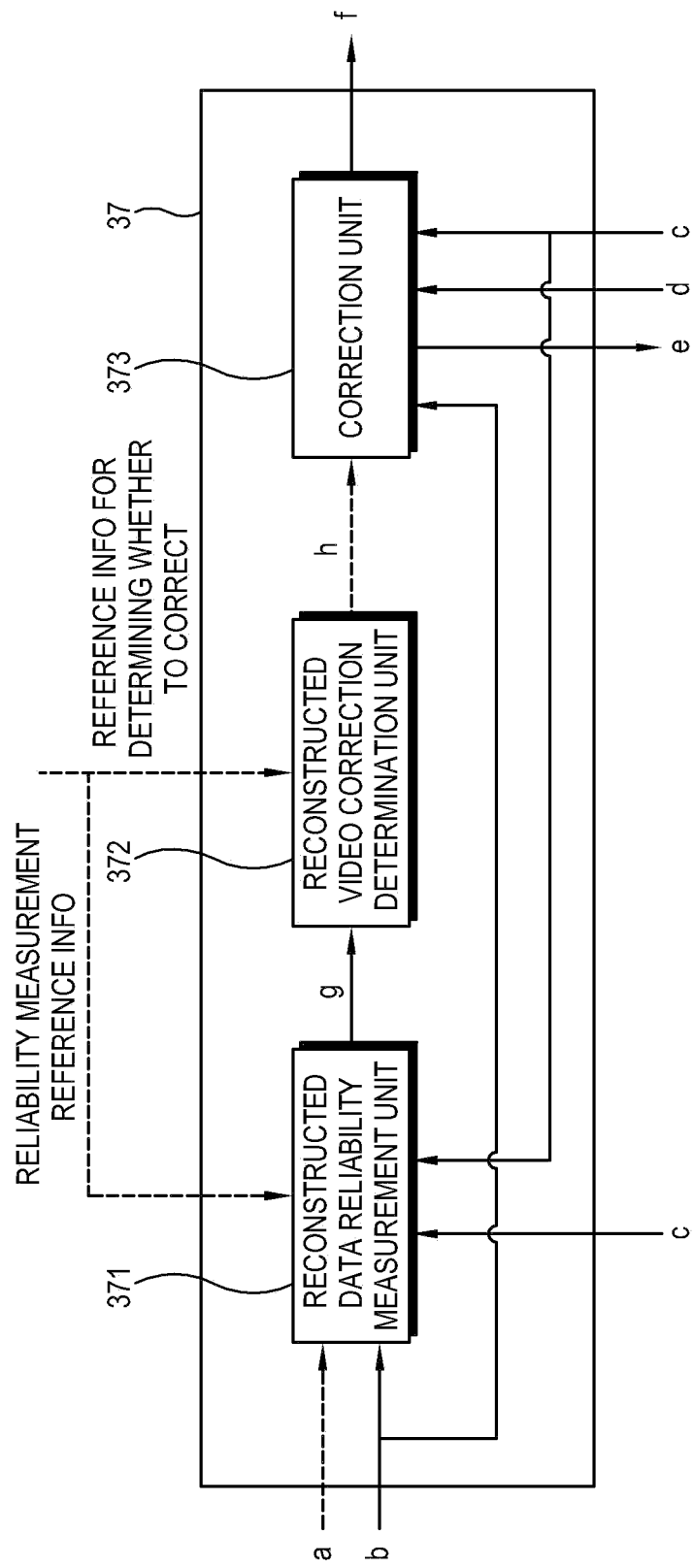
FIG. 3 is a diagram showing an example of the construction of the video correction unit of the decoding apparatus of FIG. 2.

FIG. 3 is a diagram showing the construction of the video correction unit 37 according to the present invention. As shown in FIG. 3, the video correction unit 37 according to the present invention includes a reconstructed data reliability measurement unit 371, a reconstructed current WZ picture correction determination unit 372, and a correction unit 373.

Figure 4:
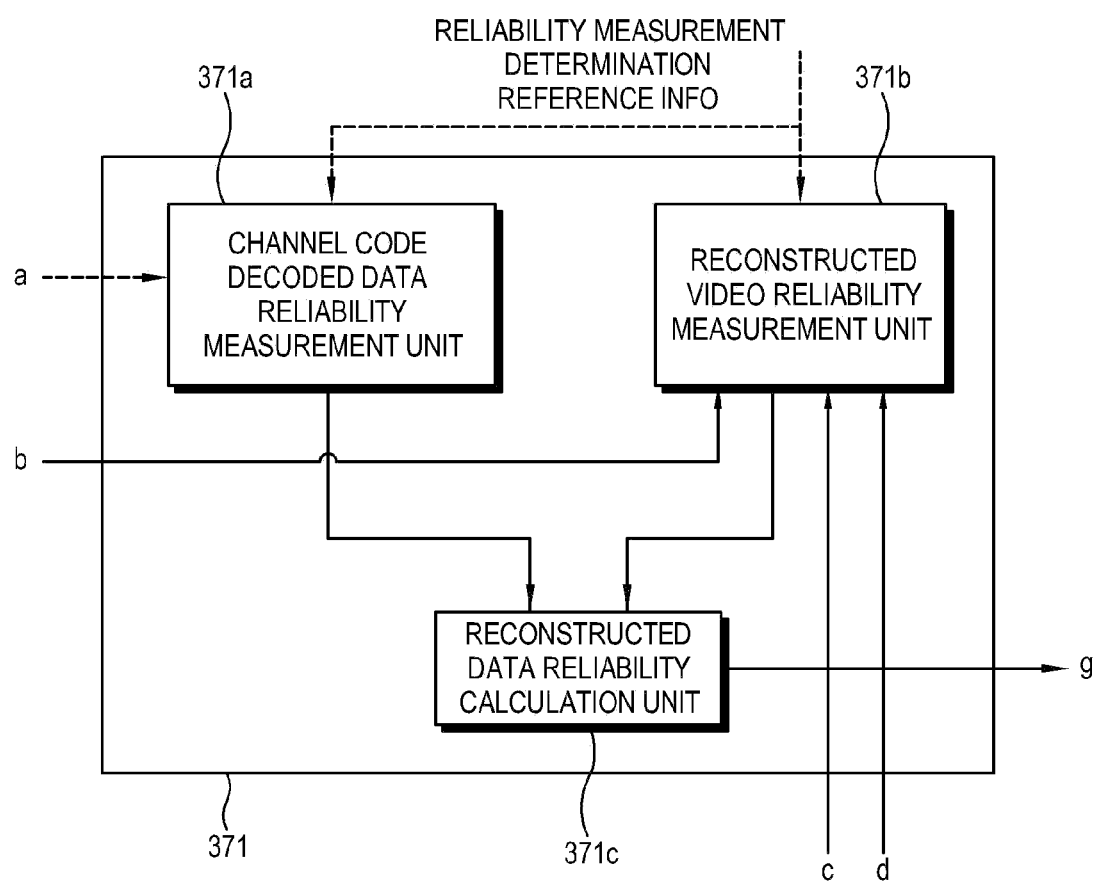
FIG. 4 is a diagram showing an example of the construction of the reconstructed data reliability measurement unit of the video correction unit of FIG. 3.
Figure 5:
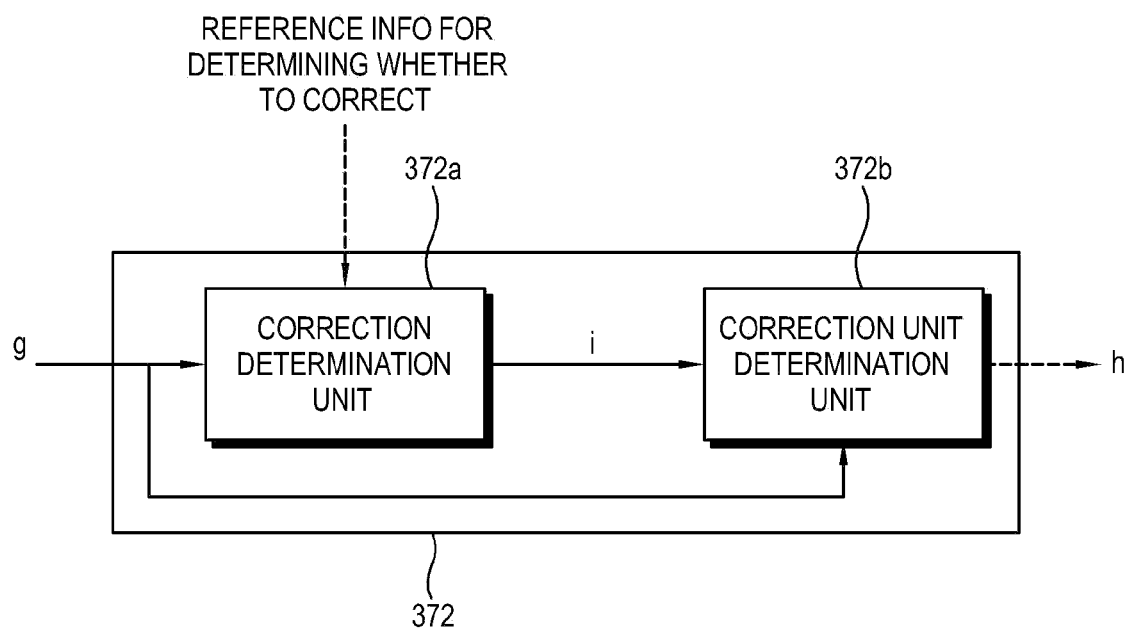
FIG. 5 is a diagram showing an example of the construction of the reconstructed video correction determination unit of the video correction unit of FIG. 3.
Figure 6:
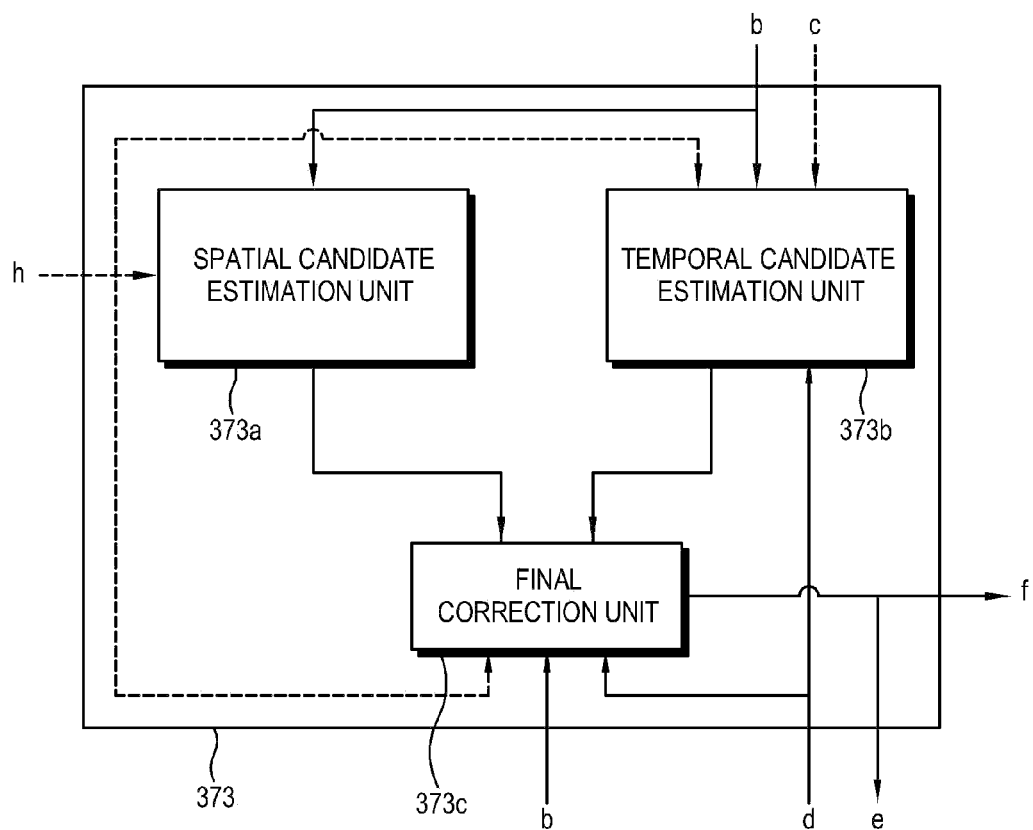
FIG. 6 is a diagram showing an example of the construction of the correction unit of the video correction unit of FIG. 3.

The reconstructed current WZ picture reliability measurement unit 371 measures the reliability of reconstructed current WZ picture using the decoding results of the channel code decoding unit 32 and/or additional information 'a' received from the encoding apparatus and/or the spatial similarity within the reconstructed current WZ picture 'b' and/or the temporal similarity between the reconstructed current WZ picture 'b' and the key picture and/or the previous WZ picture 'd' and/or the side information 'c'. An example of the configuration thereof is illustrated in FIG. 4. The reconstructed current WZ picture correction determination unit 372 determines whether to perform correction and determines a correction value based on the measured reliability. An example of the construction thereof is illustrated in FIG. 5. Furthermore, the correction unit 373 corrects the reconstructed using the spatial and/or temporal similarity of the pictures. An example of the construction thereof is illustrated in FIG. 6.

Referring to FIG. 4, the reconstructed current WZ picture reliability measurement unit 371 includes: a channel code decoded data reliability measurement unit 371a for measuring the channel code decoded data reliability by using decoding results input by the channel code decoding unit 32 and/or additional information 'a' received from the encoding apparatus; a reconstructed current WZ picture reliability measurement unit 371b for measuring the reconstructed current WZ picture reliability by using picture similarity available for the decoding apparatus; and a reconstructed current WZ picture reliability calculation unit 371c for calculating the reconstructed current WZ picture reliability based on the measurement of the channel code decoded data reliability measurement unit 371a and/or that of the reconstructed current WZ picture reliability measurement unit 371b. Here, the channel code decoded data reliability measurement unit 371a may measure the channel code decoded data reliability using soft output of the channel code and/or additional information received from the encoding apparatus such as Cyclic Redundancy Check (CRC).

Here, in order to measure reliability based on the soft output, the Wyner-Ziv decoding apparatus 30 compares the error rate of a decoded value which causes the calculated soft output to be the largest one with a threshold value $\xi_1$, and relies on decoding results if the error rate is equal to or less than the threshold value, but does not rely on the decoding results if the error rate is greater than the threshold value. This is a method of using soft output only when the data guarantees sufficient reliability, rather than calculating reliability directly from the soft output itself since the reliability of the soft output is not high enough. This may be expressed as the following Equation 1:

$$\text{Bit-level coding: } q = 0, 1 \quad \text{[Equation 1]}$$

$$\text{Symbol-level coding: } q = [0, 2^M - 1]$$

where $M$ is assigned bits for $q$, given threshold $\xi_1$ $$1 - \max_{\forall q} P(q(i,j)|Y^n) \leq \xi_1 \rightarrow Confidence[\hat{X}(i,j)] =$$

$$1 \rightarrow \text{no error}$$

$$1 - \max_{\forall q} P(q(i,j)|Y^n) > \xi_1 \rightarrow Confidence[\hat{X}(i,j)] =$$

$$0 \rightarrow \text{error}$$

Here, $Y^n$ is side information for each block of length n, $\hat{X}(i,j)$ is a pixel value at location (i,j) within the reconstructed WZ picture 'b', and q(i,j) is the quantization symbol of $\hat{X}(i,j)$ or some bits of the value. Furthermore, $\xi_1$ is a threshold value that is used as a reference for estimating the reliability of the decoded data.

The above-described equation intended to measure the channel code decoded data reliability is one of examples of measuring the reliability. Various approaches other than the above embodiment are possible.

Figure 7:
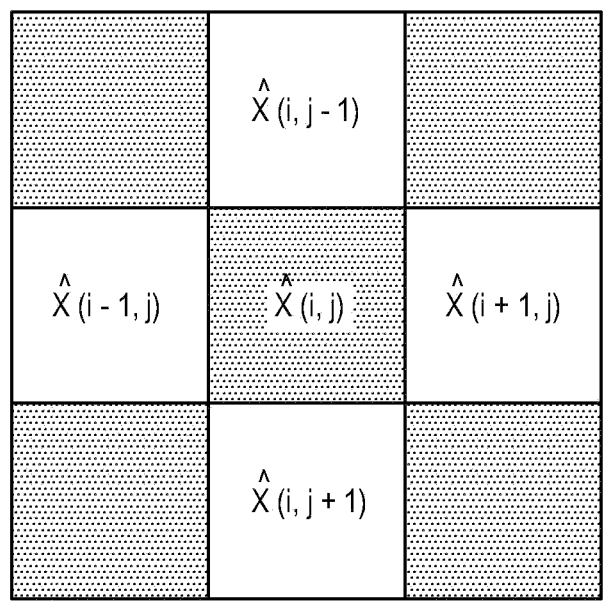
FIG. 7 is a diagram showing an example of a specific pixel and its neighboring pixels.

Meanwhile, the reconstructed current WZ picture reliability measurement unit 371b calculates the difference between each pixel and the maximum and minimum of its neighboring pixels shown in FIG. 7 within the WZ picture 'b' using the following Equation 2 in order to measure the spatial similarity between the pixel and its neighboring pixels:

$$N[\hat{X}(i,j)] = \quad \text{[Equation 2]}$$

$$\{\hat{X}(i-1,j), \hat{X}(i+1,j), \hat{X}(i,j-1), \hat{X}(i,j+1)\}$$

$$\Delta_{max} = \hat{X}(i,j) - \max N[\hat{X}(i,j)],$$

$$\Delta_{min} = \min N[\hat{X}(i,j)] - \hat{X}(i,j)$$

$$\Delta = \frac{\Delta_{max} + |\Delta_{max}| + \Delta_{min} + |\Delta_{min}|}{2}$$

$$\Delta \leq \xi_2 \rightarrow Confiedence[\hat{X}(i,j)] = 1 \rightarrow \text{no error}$$

$$\Delta > \xi_2 \rightarrow Confiedence[\hat{X}(i,j)] = 0 \rightarrow \text{error}$$

Here, $\hat{X}(i,j)$ is the value of a pixel at location (i,j) within the reconstructed WZ picture 'b' and $N[\hat{X}(i,j)]$ are the spatially neighboring pixels within the WZ picture 'b' as shown in FIG. 7. Furthermore, $\xi_2$ is a threshold value that is used as a reference for estimating the reconstructed current WZ picture reliability.

In order to promote understanding, the following example is taken. When the pixel value $\hat{X}(i,j)$ is 152 and the spatially neighboring pixel values $N[\hat{X}(i,j)]$ for the corresponding pixel value are $\{70,68,91,78\}$, max $N[\hat{X}(i,j)]$ is 91 and min $N[\hat{X}(i,j)]$ is 68, $\Delta_{max}$ is 61 and $\Delta_{min}$ is −84. Accordingly, $\Delta$ is $$\frac{61 + 61 - 84 + 84}{2},$$

which is the same as $\Delta_{max}$, that is, 61. Furthermore, in the case where $\xi_2$ is the standard deviation of neighboring pixels, $\xi_2$ is 9.04. Consequently, the calculation results indicate that there is an error at a corresponding location since the reliability of the corresponding pixel is low.

Meanwhile, the reconstructed current WZ picture reliability measurement unit 371b calculates difference between corresponding pixels in the side information 'c' and the reconstructed WZ picture 'b' using the following Equation 3 in order to measure the temporal similarity:

$$\Delta = |\hat{X}(i,j) - Y(i,j)|$$

$$\Delta \leq \xi_3 \rightarrow Confidence[\hat{X}(i,j)] = 1 \rightarrow \text{no error}$$

$$\Delta > \xi_3 \rightarrow Confidence[\hat{X}(i,j)] = 0 \rightarrow \text{error} \quad \text{[Equation 3]}$$

Here, Y(i,j) is a pixel value at location (i,j) within the side information 'c', and $\xi_3$ is a threshold value that is used as a reference for estimating the reconstructed current WZ picture reliability.

The above-described equations used to measure the reconstructedcurrent WZ picture reliability from spatial and/or temporal similarity are one of examples of measuring the reconstructed video reliability. Various approaches other than the above-described embodiment are possible.

The reconstructed current WZ picture reliability calculation unit 371c calculates the reconstructed current WZ picture reliability based on any one or both of the channel code decoded data reliability and the reconstructed current WZ picture reliability. For example, the reconstructed current WZ picture reliability calculation unit 371c compares error rate at each pixel location, estimated based on the soft output, with the predetermined threshold value $\xi_1$, that is error determination reference information, as illustrated in Equation 1, and infer that the pixel having low reliability if the value is greater than the threshold value. Furthermore, if, with respect to a location that is determined to have high reliability as a result of the measurement of the channel code decoded data reliability, the Δ value of Equation 2 is greater than a corresponding threshold value $\xi_2$, which is error determination reference information, it is determined that the reliability of a pixel value is low. The threshold value $\xi_2$ may be preliminarily set to a predetermined value or, alternatively, the standard deviation of neighboring pixels may be obtained and used as the threshold value.

Various methods as well as the above-described sequential construction may be used in the implementation of the method of calculating the reconstructed current WZ picture reliability. The present invention is not limited by any method described herein.

Referring to FIG. 5, the reconstructed current WZ picture correction determination unit 372 includes a correction determination unit 372a for determining whether to correct reconstructed current WZ picture based on the measured reconstructed current WZ picture reliability and a correction unit determination unit 372b for determining a correction unit by which correction will be applied during correction.

Here, the correction determination unit 372a may determine whether to perform correction by using statistical information obtained through many experiments. The correction determination unit 371a determines to correct reconstructed current WZ picture if the reliability is equal to or greater than the threshold value, or otherwise determines not to correct the reconstructed current WZ picture by receiving the reconstructed current WZ picture reliability of each pixel from the reconstructed current WZ picture reliability measurement unit, calculating the average reconstructed current WZ picture reliability for the entire picture, and comparing this with a threshold value provided by statistical information. When it is determined to correct the reconstructed current WZ picture, the correction unit determination unit 372b examines the distribution of pixels having low reliability, and allows the region having a small number of unreliable pixels to be updated for each pixel so that both spatial and temporal similarity can be utilized during correction, on the other hand, allow the region having a large number of unreliable pixels to be updated for each block unit so that only temporal similarity is utilized for correction. These are based on the general knowledge that spatial similarity decreases in the case where unreliable pixels are concentrated. Various methods as well as the above-described method may be used in the implementation of the correction determination unit 372a and the correction unit determination unit 372b. The present invention is not limited by any method described herein.

Figure 8:
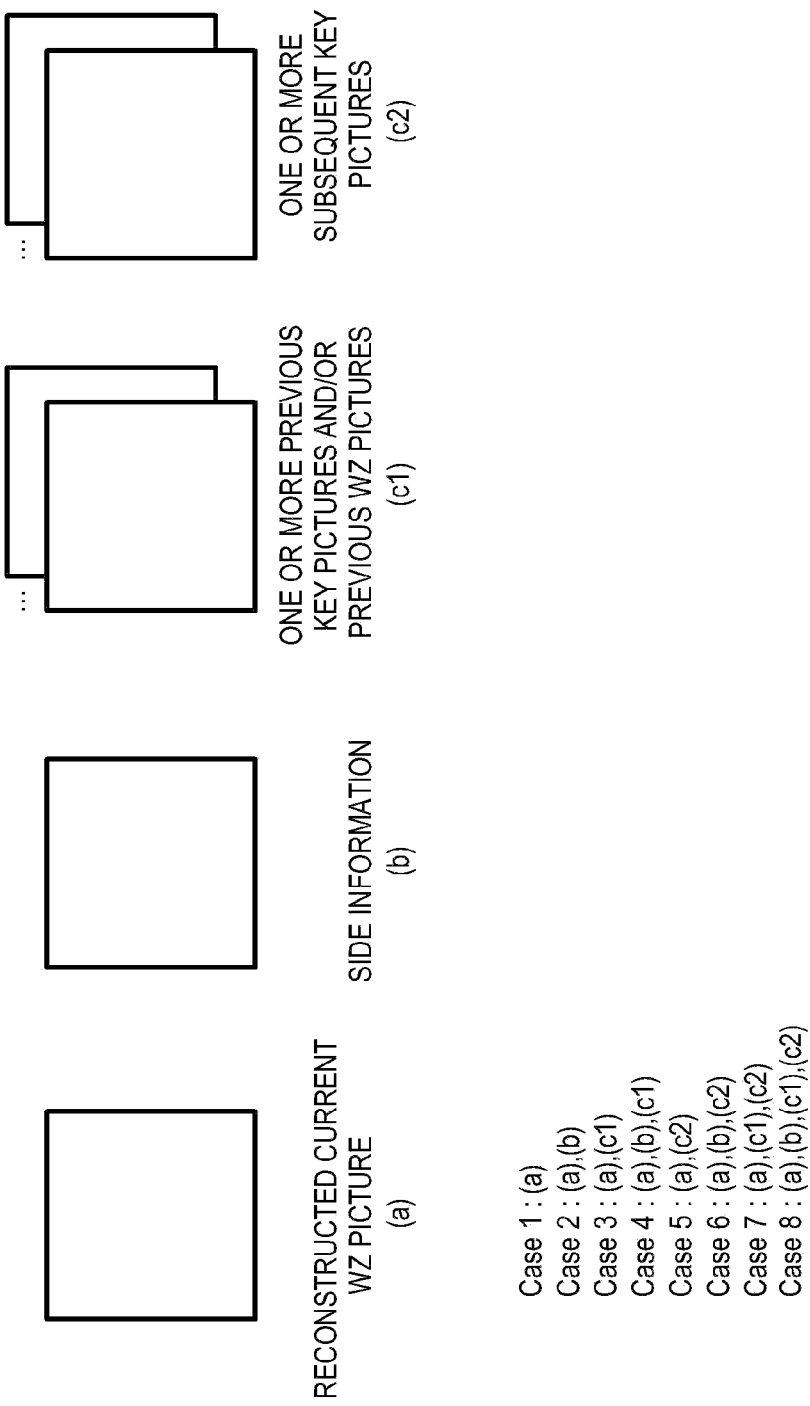
FIG. 8 is a diagram showing examples of reference pictures that are used by the correction unit of the present invention so as to correct reconstructed video.

Referring to FIG. 6, the correction unit 373 performs the correction of side information on a location 'h' at which a pixel determined to have low reconstructed current WZ picture reliability is present, using all or part of the information shown in FIG. 8.

When a value used to correct a pixel having low reconstructed current WZ picture reliability is calculated, an implementation may be presented in the form of any one or a combination of Cases 1~8 shown in FIG. 8. The type of input data required by the correction unit 373 is determined depending on the form of the implementation. The correction unit 373 includes a spatial candidate estimation unit 373a for estimating an appropriate candidate value based on spatial similarity to neighboring pixels, a temporal candidate estimation unit 373b for estimating an appropriate candidate value based on the temporal similarity between one or more reconstructed key pictures and/or one or more previous WZ pictures 'd' and the reconstructed WZ picture 'b' and a final correction unit 373c for correcting the pixel having low reconstructed current WZ picture reliability using the estimated candidate values.

The correction unit 373 may be configured in various forms depending on the type of reference picture that will be used to estimate a correction value, as shown in FIG. 8. That is, in Case 1 of FIG. 8 in which only a spatial candidate value is taken into consideration, the temporal candidate estimation unit 373b constituting part of the correction unit 373 may be excluded from the construction of the correction unit 373.

An example of the spatial candidate estimation unit 373a of the correction unit 373 is to estimate the most appropriate candidate value to be a median value among the current pixel and its neighboring pixels shown in FIG. 7 using Equation 4. This corresponds to Case 2 of FIG. 8.

$$\hat{X}(i,j)'=\text{median}(N[\hat{X}(i,j)],\hat{X}(i,j)) \quad \text{[Equation 4]}$$

In Equation 4, the use of a median value is not the only method, but various functions may be used depending on user preference. In Equation 4, $\hat{X}(i,j)'$ is the pixel value of WZ picture 'f', that is, corrected reconstructed current WZ picture.

The temporal candidate estimation unit 373b shown in FIG. 6 may be configured to additionally use side information 'c' updated by the side information update unit 36, as indicated by a corresponding dotted line in FIG. 6.

Furthermore, the spatial candidate estimation unit 373a and the temporal candidate estimation unit 373b may be configured in a parallel structure so that the final correction unit 373c can use together the results of the estimation of the spatial candidate estimation unit 373a and the temporal candidate estimation unit 373b. The spatial candidate estimation unit 373a and the temporal candidate estimation unit 373b may be configured in a sequential structure so that the results of the estimation of any one can be used by the other. Alternatively, a configuration using only one type of candidate estimation unit may be considered so as to simplify the structure of the apparatus, and thus various configurations may be taken into consideration.

The temporal candidate estimation unit 373b of the correction unit searches for a candidate most similar to the value of the relevant location of the reconstructed WZ picture 'b' through motion estimation that uses one or more reconstructed key pictures and/or the previous WZ pictures c1 and c2 as reference pictures, as shown in FIG. 8. The reference pictures used in such motion estimation may be temporally previous one or more key pictures and/or one or more previous WZ pictures compared to the reconstructed WZ picture to be currently corrected (which are used in forward estimation, and correspond to Cases 3 and 4 of FIG. 8), may be one or more subsequent key pictures (which are used in backward estimation, and correspond to Cases 5 and 6 of FIG. 8), or may be one or more previous-subsequent key pictures and/or one or more previous WZ pictures (which are used in bidirectional estimation, and correspond to Cases 7 and 8 of FIG. 8).

In this case, the location of a reference image most similar to the current image of the reconstructed WZ picture 'b' is estimated through the searching on the selected key pictures and/or previous WZ pictures. In this way, forward, backward and bidirectional motion estimations are performed, so that three candidates having highest similarities in respective directions are found, and the one having the lowest block matching error, such as the Sum of Absolute Differences (SAD) is estimated as the best candidate.

Alternatively, it is possible to create an appropriate candidate value by combining all or part of the three candidate values through a predetermined procedure, rather than selecting one candidate value from among the three candidate values. Alternatively, in order to reduce the computational load of motion estimation, it is possible to estimate a candidate value by performing only one of forward motion estimation and backward motion estimation. Since additional types of motion estimation may be taken into consideration, all appropriate types of motion estimation are included in the scope of the present invention.

Finally, the final correction unit 373c corrects the pixel value of each location of the reconstructed WZ picture 'b' which is detected as having low reconstructed current WZ picture reliability, using the calculated candidate value. In this case, it is possible to selectively correct all or part of pixel values depending on the reconstructed date reliability at respective locations, rather than performing correction blindly.

Figure 9:
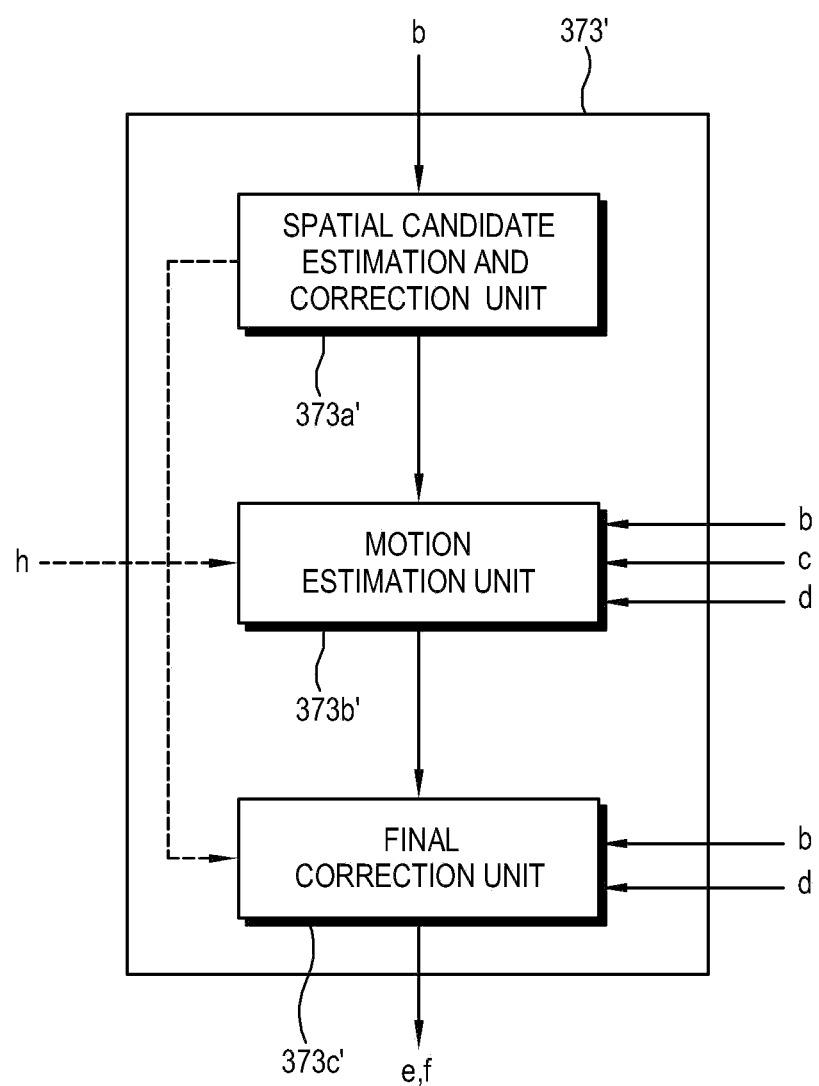
FIG. 9 is a diagram showing another example of the construction of the correction unit of the video correction unit of FIG. 2.

In order to further increase the accuracy of the above-described error correction using the temporal candidate estimation, the correction unit 373 of FIG. 3 may be configured as shown in FIG. 9. Referring to FIG. 9, the correction unit 373' estimates a correction candidate value using spatial similarity through the spatial candidate estimation and correction unit 373'a, like the spatial candidate estimation unit 373a of FIG. 6, corrects a value at a pixel location (which is referred as an 'error occurrence location') having low reconstructed current WZ picture reliability, estimates a temporal candidate value using the above-described motion estimation through the motion estimation unit 373'b, and corrects the error occurrence location again using the value at the final correction unit 373'c. Since further improved error correction can be performed using the spatial candidate estimation and correction unit 373'a and motion estimation is performed using this corrected value, a more accurate candidate value can be estimated when a temporal candidate value is estimated, so that video quality can be further improved.

A distributed coded video decoding method capable of successively improving side information on the basis of the reconstructed current WZ picture reliability according to the present invention will be described in detail below with reference to FIGS. 10 to 13.

Figure 11:
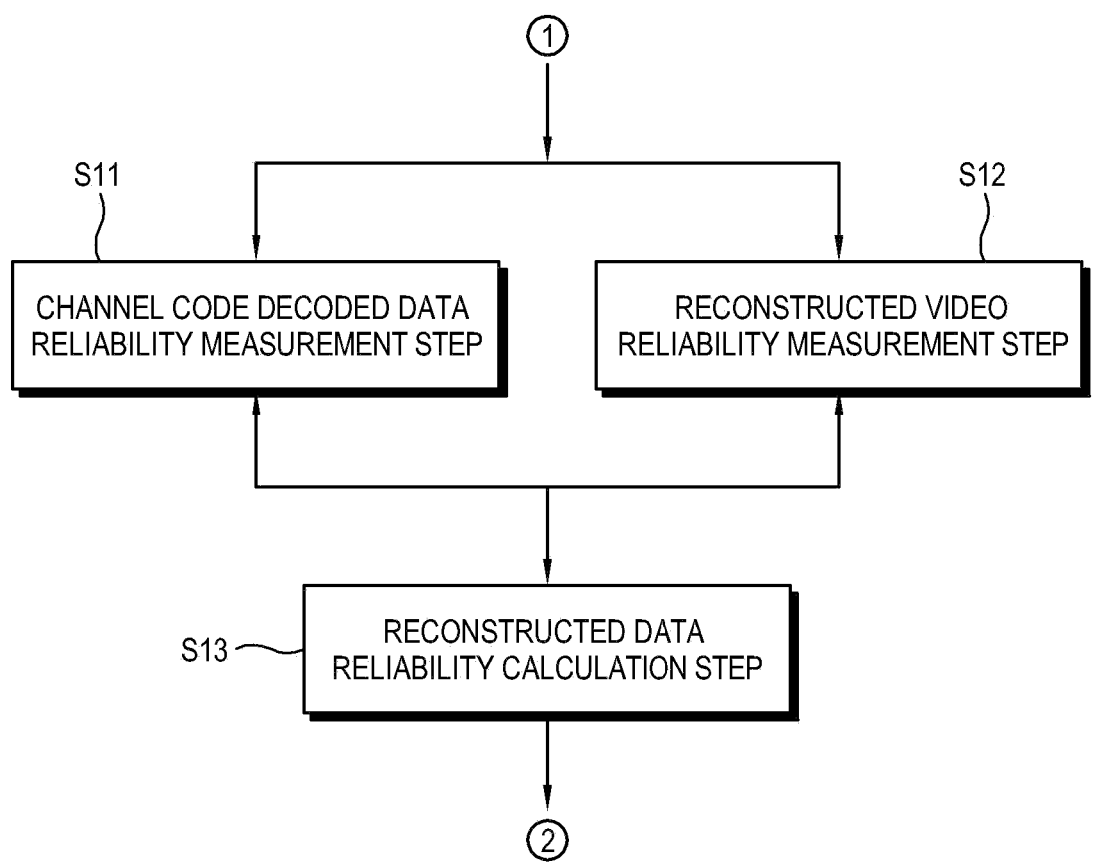

Although a reconstructed current WZ picture reliability measurement step by the video correction unit S10 may be implemented in various forms, an embodiment thereof is illustrated in FIG. 11. Referring to FIG. 11, the channel code decoded data reliability is measured using the decoding results of the channel code and/or the information 'a' transmitted from the encoding apparatus at a channel code decoded data reliability measurement step S11. In this embodiment, the channel code decoded data reliability is measured based on the relationship between largeness and smallness between the error rate of decoded value which causes the soft output of each pixel to be the largest one and the above-described threshold value, as described in the above-described Equation 1.

At a reconstructed current WZ picture reliability measurement step S12, the reconstructed current WZ picture reliability is calculated using Equation 2 based on the difference between each pixel of the reconstructed WZ picture 'b' and the maximum and minimum of its neighboring pixels or Equation 3 based on the difference between corresponding pixels in the side information 'c' and the reconstructed WZ picture 'b'.

The calculation of the difference between corresponding values in order to measure reliability is only one example, so that other calculation methods may be used.

With regard to the reliability calculated at steps S11 and S12, at a reconstructed current WZ picture reliability calculation step S13, as described above, the error rate measured from the soft output of the channel code as shown in the above-described Equation 1 and the predetermined threshold value $\xi_1$ are compared with each other, and a corresponding pixel is detected as being an unreliable pixel if the value is greater than the threshold value $\xi_1$ or the measured reconstructed current WZ picture reliability value, that is the value of Equation 2, is greater than the predetermined threshold value $\xi_2$.

Figure 10:
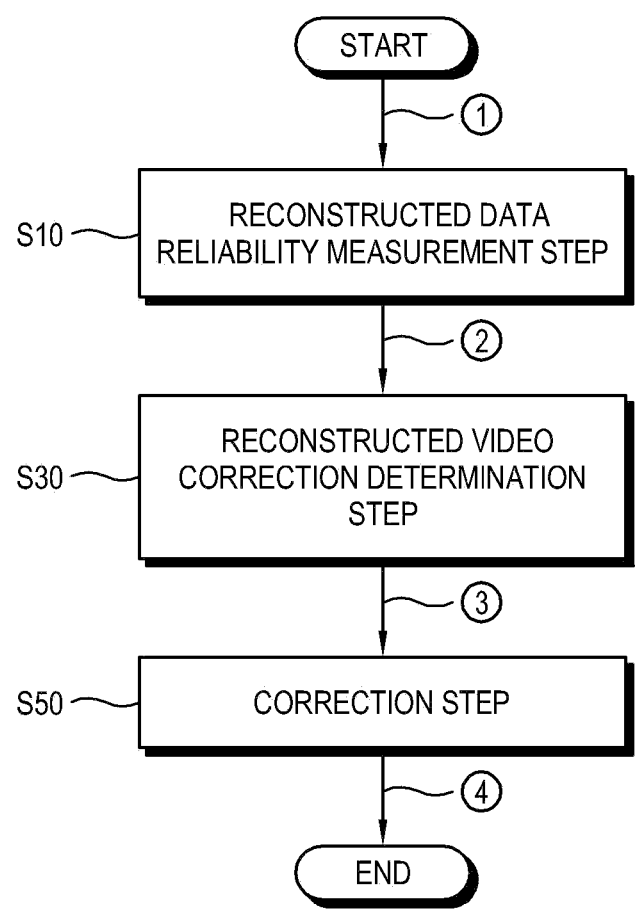
FIGS. 10 to 14 are diagrams illustrating a distributed coded video decoding method capable of successively improving side information on the basis of the reliability of reconstructed data.

Although an embodiment of the reconstructed current WZ picture reliability measurement step by the video correction unit S10 of FIG. 10 shown in FIG. 11 is configured to use the decoding results of the channel code or both temporal and spatial similarity of the reconstructed current WZ picture at the reconstructed current WZ picture reliability calculation step S13, the reconstructed current WZ picture reliability calculation step S13 may be performed based on only one of the channel code decoded data reliability and reconstructed current WZ picture reliability depending on application as described above.

Figure 12:
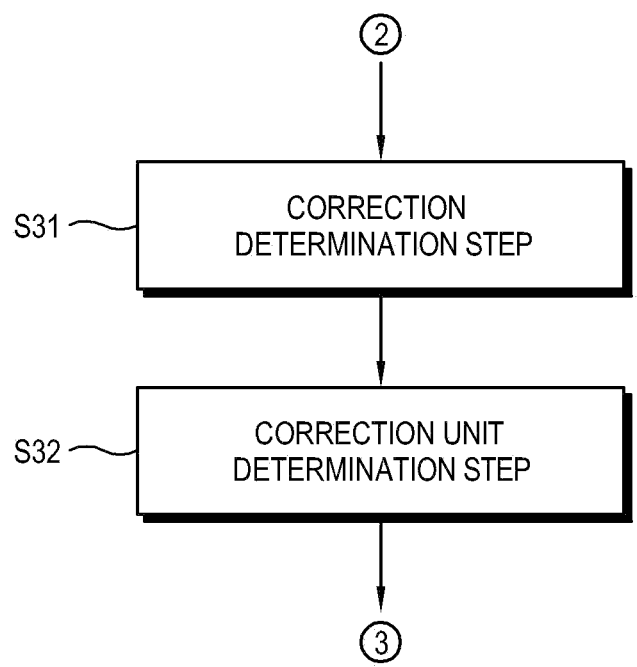

Although a reconstructed current WZ picture correction determination step by the video correction unit S30 may be implemented in various forms shown in FIG. 10, an embodiment thereof is illustrated in FIG. 12. Referring to FIG. 12, whether to correct the reconstructed current WZ picture is determined based on the reconstructed current WZ picture reliability, calculated at the reconstructed current WZ picture reliability measurement step S10, at a correction determination step S31. In this embodiment, as described above, the determination of whether to perform correction is performed in such a way as to provide a threshold value obtained in a statistical way to the decoding apparatus in advance, compare this value with reconstructed current WZ picture reliability, that is, a calculated average for the entire picture, and determine whether to perform correction according to the results of the comparison. At a correction unit determination step S32, the distribution of unreliable pixels is examined, and a region having a small number of unreliable pixels is corrected for a init of each pixel so that both spatial similarity and temporal similarity can be utilized during correction, on the other hand, a region having a large number of unreliable pixels is corrected for a unit of each block so that correction can be performed using temporal similarity during correction. The correction determination unit may be implemented using various possible ways as well as the above-described method, and the present invention is not limited by any method described herein.

Figure 13:
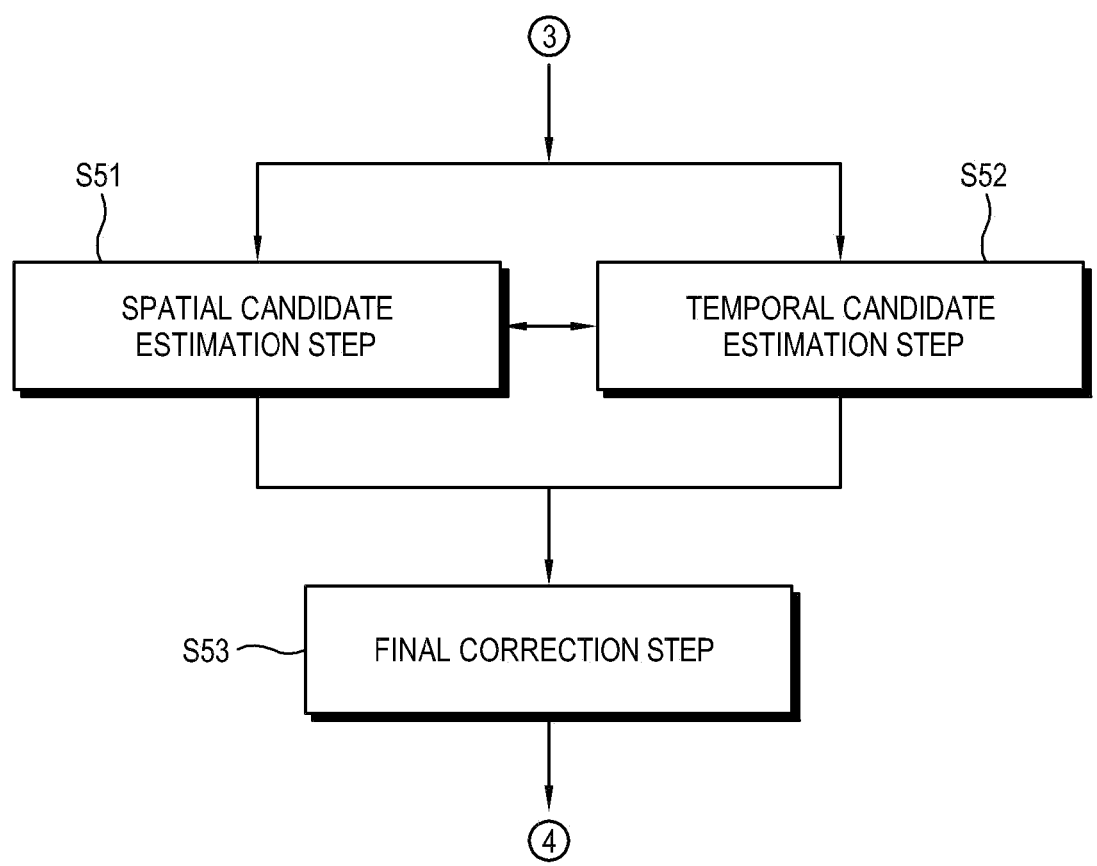

At a correction step by the video correction unit S50 shown in FIG. 13, a pixel at a location at which the reconstructed current WZ picture reliability is estimated to be low at the reconstructed current WZ picture reliability measurement step is corrected using all or part of the information shown in FIG. 8.

When a value used to correct a pixel having low reconstructed current WZ picture reliability is calculated, an implementation may be presented in the form of any one or a combination of Cases 1~8 shown in FIG. 8. The type of input data required by the correction step S50 is determined depending on the form of the implementation. In order to correct a pixel having low reconstructed current WZ picture reliability, a spatial candidate estimation step S51 of estimating an appropriate candidate value based on spatial similarity to neighboring pixels, a temporal candidate estimation step S52 of estimating an appropriate candidate value based on the temporal similarity between one or more reconstructed key pictures and/or one or more previous WZ picture 'd' and the WZ picture 'b' and a final correction step S53 of correcting the pixel having low reconstructed current WZ picture reliability using the estimated candidate values are performed, as shown in FIG. 13. At the correction step S50, various types of data may be used depending on the type of reference pictures that will be used to estimate a corrected pixel value, as shown in FIG. 8. That is, in Case 1 of FIG. 8 in which only a spatial candidate value is taken into consideration, the temporal candidate estimation step S52 may be excluded from the correction step S50.

Meanwhile, the spatial candidate estimation step S51 and the temporal candidate estimation step S52 may be performed in a parallel or sequential manner depending on user preference, or only one of them may be performed in order to achieve the simplicity of the step.

In an embodiment in which the spatial candidate estimation step S51 is performed, the most appropriate candidate value is estimated to be a median value among the current pixel and its neighboring pixels shown in FIG. 7 using Equation 4. This corresponds to the Case 2 of FIG. 8. In Equation 4, the use of a median value is not all the methods, but various functions may be used depending on user preference.

Furthermore, depending on user preference, the spatial candidate estimation step S51 and the temporal candidate estimation step S52 may be performed in a parallel manner structure, or may be performed in a sequential manner so that the results of one candidate estimation step can be used at the other candidate estimation step before the final correction step S53. Alternatively, only one candidate estimation step may be performed so as to simplify the configuration of the method.

At the temporal candidate estimation step S52, a candidate most similar to the value of the relevant location of the WZ picture 'b' is searched for through motion estimation that uses reconstructed one or more key pictures and/or the previous WZ pictures c1 and c2 as one or more reference pictures, as shown in FIG. 8. As described above, the reference pictures used in the motion estimation may be temporally previous one or more key pictures and/or one or more previous WZ pictures compared to the reconstructed WZ picture to be currently corrected, may be one or more subsequent key pictures, or one or more previous-subsequent key pictures and/or one or more previous WZ.

In this case, the location of a reference image most similar to the current image of the reconstructed current WZ picture 'b' is estimated through the searching on the selected key pictures and/or previous WZ pictures. In this way, forward, backward and bidirectional motion estimations are performed, so that three candidates having highest similarities in respective directions are found, and among the three candidate locations, one having the lowest block matching error, such as the SAD, is estimated as the best candidate. Alternatively, it is possible to create an appropriate candidate value by combining all or part of the three candidate values through a predetermined procedure, rather than selecting one candidate value from among the three candidate values. Alternatively, in order to reduce the computational load of motion estimation, it is possible to estimate a candidate value by performing only one of forward motion estimation and backward motion estimation. Since additional types of motion estimation may be taken into consideration, all appropriate types of motion estimation are included in the scope of the present invention.

Finally, at the final correction step S53, the pixel value of each location of the reconstructed current WZ picture 'b', which is detected to have low reconstructed current WZ picture reliability, is corrected using the calculated candidate value. In this case, it is possible to selectively correct all or part of pixel values depending on the reconstructed current WZ picture reliability, as described above.

Figure 14:
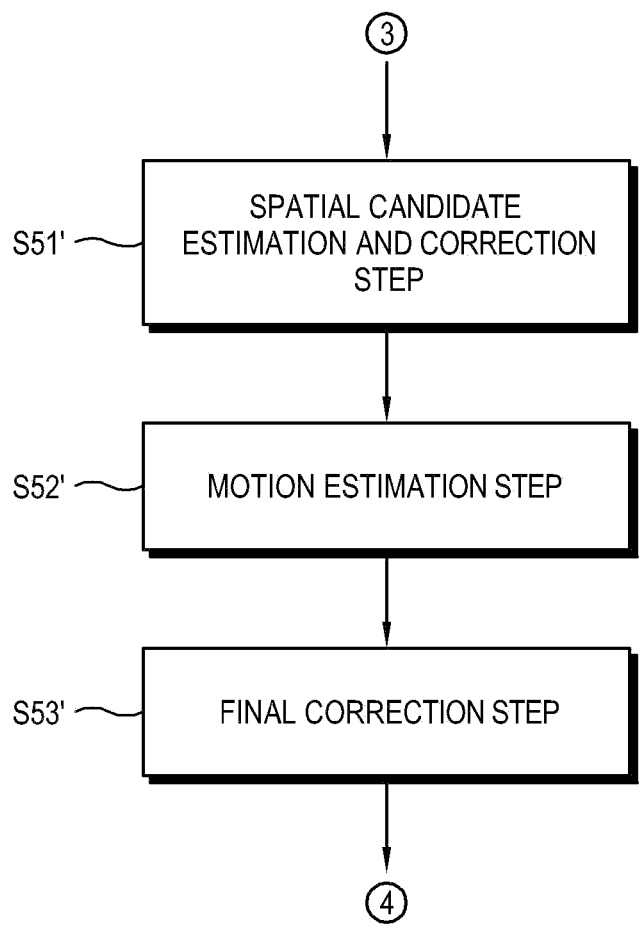

In order to further increase the accuracy of the above-described error correction using the temporal candidate estimation, the correction step S50 of FIG. 10 may be performed as shown in FIG. 14. Referring to FIG. 14, a correction candidate value is estimated using spatial similarity through a spatial candidate estimation and correction step S51', like the spatial candidate estimation step S51 of FIG. 13, a value at an error occurrence location is corrected, a temporal candidate value is estimated using the above-described motion estimation at a motion estimation step S52', and the error occurrence location is corrected again using the value at a final correction step S53'. Since further improved error correction can be performed through the spatial candidate estimation and correction step S52' and motion estimation is additionally performed using this corrected value, a more accurate candidate value can be estimated when a temporal candidate value is estimated, so that video quality can be further improved.

Figure 15:
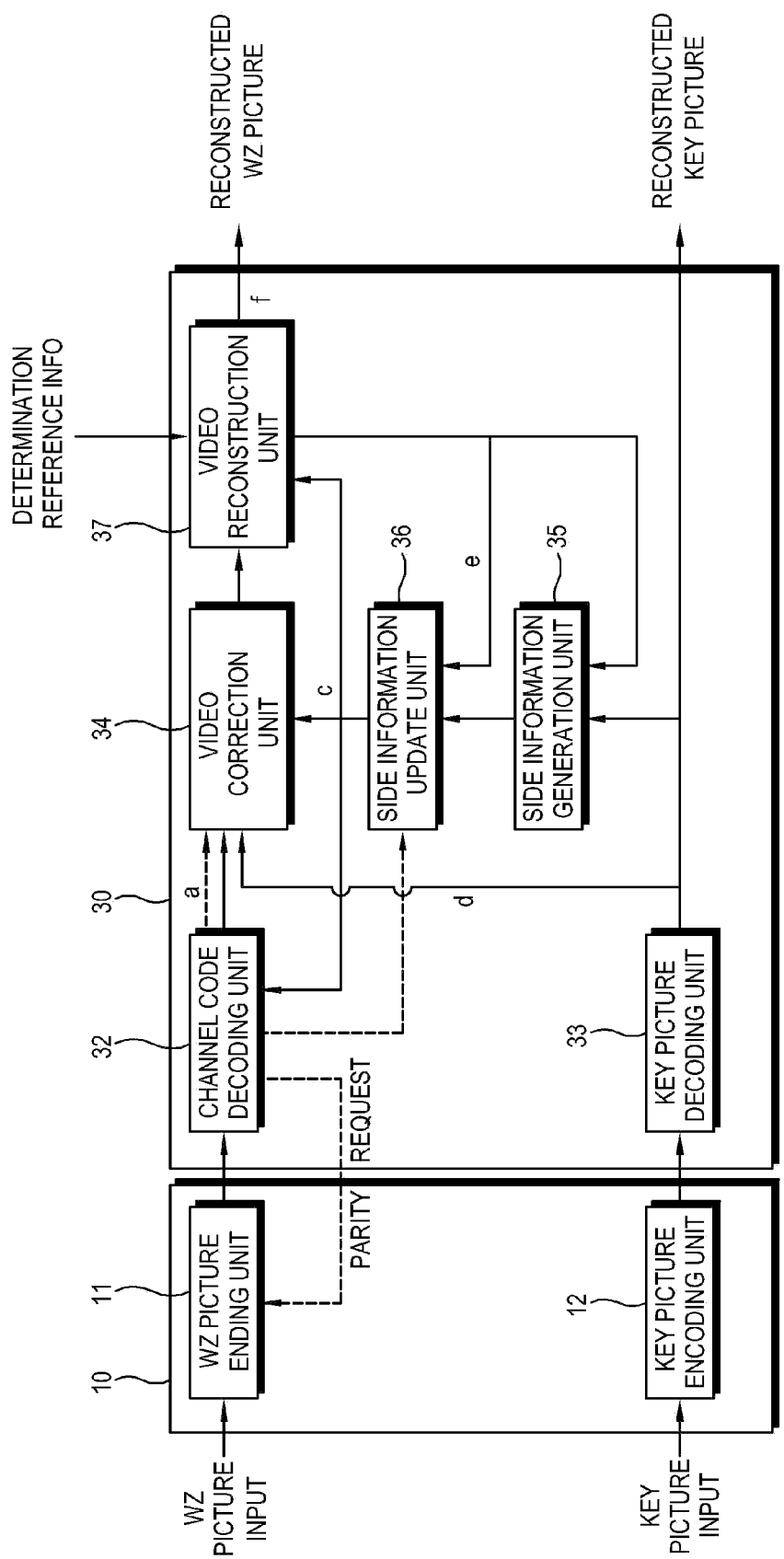
FIG. 15 is a diagram illustrating another example of the construction of a distributed coded video decoding apparatus capable of successively improving side information on the basis of the reliability of reconstructed data.

Although in the embodiment of the present invention, the video correction unit has been described as being located after the video reconstruction unit, the gist of the present invention can be applied to any case where the video correction unit is located before or after the video reconstruction unit. In the case where the video correction unit of the present invention is located before the video reconstruction unit, a construction, such as that shown in FIG. 15, is provided. In this case, the same function may be provided by using only channel code decoding reliability when the reconstructed current WZ picture reliability is measured and referring to the decoding results of the channel code instead of referring to the results of video during correction determination and during correction.

Figure 16:
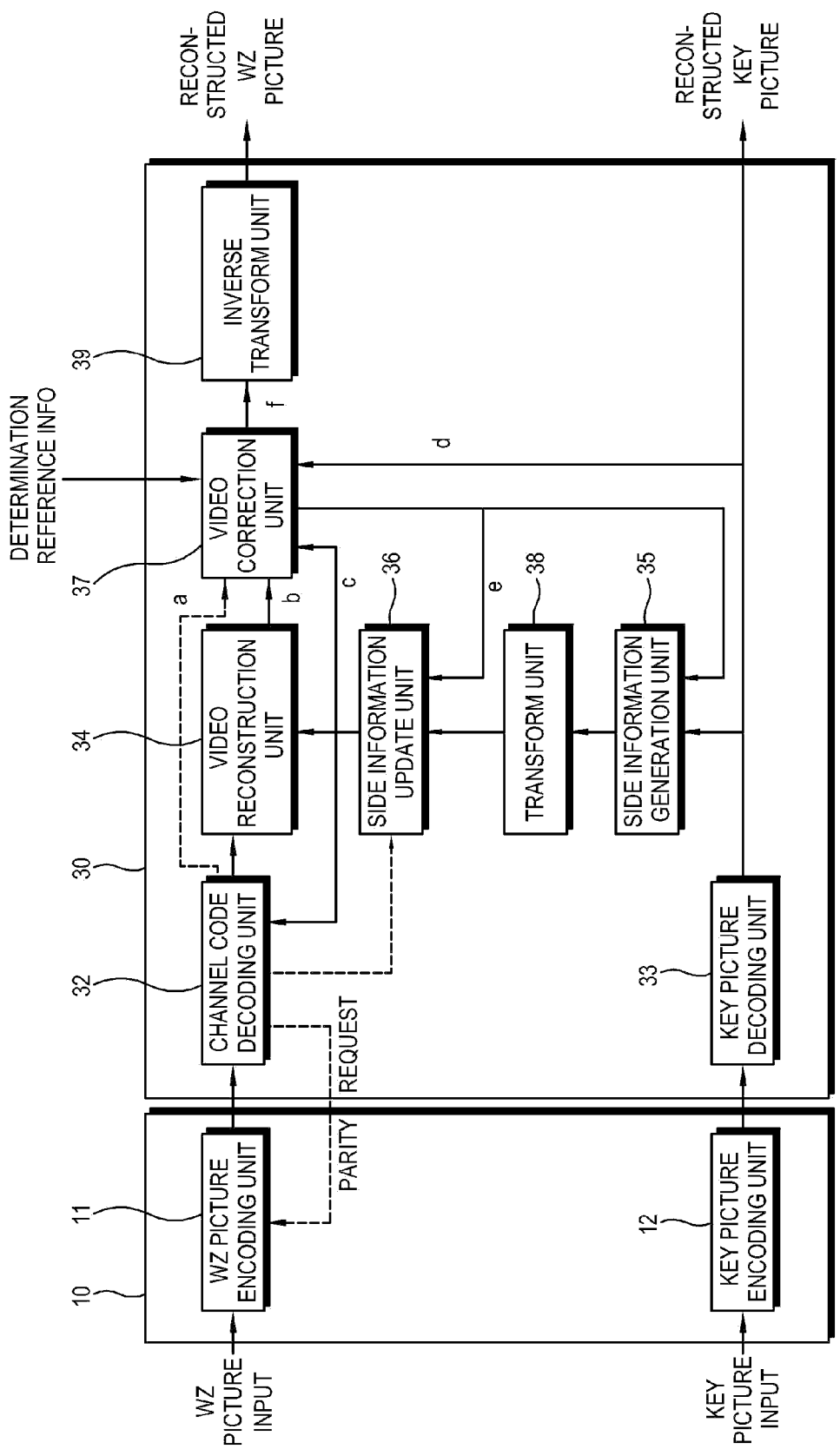
FIG. 16 is a diagram showing the construction of a Wyner-Ziv encoding apparatus and the construction of a distributed coded video decoding apparatus, in transform domain, capable of successively improving side information on the basis of the reliability of reconstructed data, which includes reconstructed data reliability measurement and reconstructed video correction functions, according to the present invention.

Although in the embodiment of the present invention, all the encoding and decoding processes including quantization have been described as being performed in the pixel domain, the gist of the present invention can be applied to the case where encoding and decoding are performed in the transformation domain, rather than the pixel domain. In the case where the present invention is applied to the transformation domain, a transform unit 38 and an inverse transform unit 39 may be additionally used, as shown in FIG. 16. Furthermore, since the locations of the transform unit 38 and inverse transform unit 39 of FIG. 16 may be changed depending on implementation, various configurations are possible as long as it does not depart from the scope of the present invention.

Accordingly, the terms pixel, relevant location or picture used in the present invention may be considered to be a transform coefficient or picture in the transform domain, such as the integer transform, Discrete Cosine Transform (DCT) or wavelet transform, depending on the implementation of the present invention. In the case where it is considered to be a transform coefficient in the transform domain, the transform unit 38 and the inverse transform unit 39 shown in FIG. 16 are provided in FIG. 2, in which case the term pixel used in the description of the present invention may be considered the term transform coefficient.

As described above, the decoding method and apparatus capable of successively improving side information on the basis of the reconstructed current WZ picture reliability in Wyner-Ziv coding technology according to the embodiments of the present invention are provided.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A distributed coded video decoding apparatus, comprising:
   a key picture decoding unit for reconstructing key pictures transmitted from an encoding apparatus;
   a side information generation unit for generating side information using at least one of the key pictures reconstructed by the key picture decoding unit and/or a previously reconstructed Wyner-Ziv (WZ) picture by a video reconstruction unit;
   a side information update unit for updating the side information using the side information generated by the side information generation unit and a corrected reconstructed WZ picture corrected by a video correction unit;
   a channel code decoding unit for decoding quantization symbols using parity bits transmitted from the encoding apparatus and the side information from the side information update unit;
   the video reconstruction unit for reconstructing a current WZ picture, which is a decoding target, using the quantization symbols decoded by the channel code decoding unit and the side information received from the side information update unit; and
   the video correction unit for calculating reliability of the reconstructed current WZ picture using at least one of channel code decoded data reliability from the channel code decoding unit and a reconstructed video reliability from the video reconstruction unit, determining whether to correct the reconstructed current WZ picture and determining a correction unit based on the calculated reliability of the reconstructed current WZ picture, and then correcting the reconstructed current WZ picture.

2. The distributed coded video decoding apparatus as set forth in claim 1, wherein the video correction unit comprises:
   a reconstructed current WZ picture reliability measurement unit for calculating the reliability of reconstructed current WZ picture by measuring at least one of the channel code decoded data reliability and a reconstructed video reliability;
   a reconstructed video correction determination unit for determining whether to correct the reconstructed current WZ picture and determining a correction value based on the reliability of reconstructed current WZ picture; and
   a correction unit for correcting the reconstructed current WZ picture based on temporal and spatial similarity.

3. The distributed coded video decoding apparatus as set forth in claim 2, wherein the reconstructed current WZ picture reliability measurement unit comprises a channel code decoded data reliability measurement unit for calculating the reliability of the channel code decoded data using at least one of soft output of channel code and additional information such as Cyclic Redundancy Check (CRC) data received from the encoding apparatus.

4. The distributed coded video decoding apparatus as set forth in claim 3, wherein the channel code decoded data reliability measurement unit measures the reliability of the channel code decoded data using the following equation:

Bit-level coding: $q=0,1$

Symbol-level coding: $q=[0,2^M-1]$ where M is assigned bits for q, given threshold $\xi_1$ $$1 - \max_{\forall q} P(q(i,j)|\underline{Y}^n) \le \xi_1 \to Confiedence[\hat{X}(i,j)] = 1 \to \text{no error}$$

$$1 - \max_{\forall q} P(q(i,j)|\underline{Y}^n) > \xi_1 \to Confiedence[\hat{X}(i,j)] = 0 \to \text{error}$$

wherein $Y^n$ is side information for each block of length n, $\hat{X}(i,j)$ is a pixel at location (i,j) within the reconstructed WZ picture, q(i,j) is a quantization symbol of $\hat{X}(i,j)$ or some bits of the value, and $\xi_1$ is a threshold value that is used as a reference for estimating the reliability of the decoded data.

5. The distributed coded video decoding apparatus as set forth in claim 2, wherein the reconstructed current WZ picture reliability measurement unit comprises a reconstructed current WZ picture reliability measurement unit for measuring the reliability of the reconstructed current WZ picture using at least one of spatial similarity between pixels within the reconstructed current WZ picture and temporal similarity between a pixel of the WZ picture and at least one corresponding pixel in the side information, key pictures and previous WZ pictures.

6. The distributed coded video decoding apparatus as set forth in claim 5, wherein the reconstructed current WZ picture reliability measurement unit measures the reliability of the reconstructed current WZ picture by measuring the spatial similarity between the pixels with the reconstructed WZ picture using the following equation:

$$N[\hat{X}(i,j)] = \{\hat{X}(i-1,j), \hat{X}(i+1,j), \hat{X}(i,j-1), \hat{X}(i,j+1)\}$$

$$\Delta_{max} = \hat{X}(i,j) - \max N[\hat{X}(i,j)], \quad \Delta_{min} = \min N[\hat{X}(i,j)] - \hat{X}(i,j)$$

$$\Delta = \frac{\Delta_{max} + |\Delta_{max}| + \Delta_{min} + |\Delta_{min}|}{2}$$

$$\Delta \le \xi_2 \to Confiedence[\hat{X}(i,j)] = 1 \to \text{no error}$$

$$\Delta > \xi_2 \to Confiedence[\hat{X}(i,j)] = 0 \to \text{error}$$

where $\hat{X}(i,j)$ is a value of a pixel at location (i,j) within the reconstructed WZ picture, $N[\hat{X}(i,j)]$ are values of spatially neighboring pixels within the reconstructed WZ picture, and $\xi_2$ is a threshold value that is used as a reference for estimating the reliability of the reconstructed current WZ picture.

7. The distributed coded video decoding apparatus as set forth in claim 5, wherein the reconstructed current WZ picture reliability measurement unit calculates the reliability of the reconstructed current WZ picture by measuring the temporal similarity between corresponding pixels of the WZ picture and the side information using the following equation:

$$\Delta = |\hat{X}(i,j) - Y(i,j)|$$

$$\Delta \le \xi_3 \to Confiedence[\hat{X}(i,j)] = 1 \to \text{no error}$$

$$\Delta > \xi_3 \to Confiedence[\hat{X}(i,j)] = 0 \to \text{error} \quad \text{[Equation 3]}$$

wherein Y(i,j) is a pixel value at location (i,j) within the side information, and $\xi_3$ is a threshold value that is used as a reference for estimating the reliability of the reconstructed current WZ picture.

8. The distributed coded video decoding apparatus as set forth in claim 2, wherein the reconstructed current WZ picture correction determination unit comprises:
- a correction determination unit for determining whether to correct; and
- a correction unit determination unit for determining a correction value.

9. The distributed coded video decoding apparatus as set forth in claim 8, wherein the correction determination unit uses at least one of a method of determining whether to correct using a preset condition and a method of correcting the reconstructed current WZ picture, calculating corresponding reliability, and determining whether to correct.

10. The distributed coded video decoding apparatus as set forth in claim 8, wherein the correction unit determination unit determines to correct a picture for one of each pixel, each block and entire video.

11. The distributed coded video decoding apparatus as set forth in claim 2, wherein the correction unit comprises:
- a spatial candidate estimation unit for estimating a spatial candidate value based on spatial similarity between a correction target pixel and its neighboring pixels;
- a temporal candidate estimation unit for estimating a temporal candidate value based on temporal similarity between a correction target pixel and a corresponding pixel within at least one of the reconstructed key picture, the previous WZ picture and the side information; and
- a final correction unit for correcting the correction target pixel using at least one of the temporal and spatial candidates.

12. The distributed coded video decoding apparatus as set forth in claim 11, wherein the spatial candidate estimation unit estimates the spatial candidate value to be a median value among the correction target pixel and its neighboring pixels.

13. The distributed coded video decoding apparatus as set forth in claim 11, wherein the temporal candidate estimation unit estimates the temporal candidate value through motion estimation for the reconstructed current WZ picture using at least one of the reconstructed key picture, the previous WZ picture and the side information as reference video.

14. The distributed coded video decoding apparatus as set forth in claim 11, wherein the final correction unit selectively corrects all or part of pixels to be corrected based on the reliability of the reconstructed current WZ picture thereof.

15. A distributed coded video decoding method, comprising:
- (a) a key picture decoding step, by a key picture decoding unit, of reconstructing key pictures, transmitted from an encoding apparatus;
- (b) a side information generation step, by a side information generation unit, of generating side information using at least one of the reconstructed key pictures and a previously reconstructed Wyner-Ziv (WZ) picture by a video reconstruction unit;
- (c) a side information update step, by a side information update unit, of updating the side information using the generated side information and a corrected reconstructed WZ picture by a video correction unit;
- (d) a channel code decoding step, by a channel code decoding unit, of estimating quantization symbols using parity bits transmitted from the encoding apparatus and the side information updated by the side information update unit;
- (e) a video reconstruction step, by the video reconstruction unit, of decoding a current WZ picture, that is a decoding target, using the quantization symbols and the updated side information;
- (f) a reconstructed data reliability measurement step, by the video correction unit, of calculating reliability of the reconstructed current WZ picture using at least one of channel code decoded data reliability obtained at the channel code decoding step and reconstructed video reliability obtained at the video reconstruction step;
- (g) a reconstructed video correction determination step, by the video correction unit, of determining whether to correct the reconstructed current WZ picture and determining a correction value based on the calculated reliability of the reconstructed current WZ picture; and
- (h) a correction step, by the video correction unit, of correcting the reconstructed current WZ picture.

16. The distributed coded video decoding method as set forth in claim 15, wherein the step (f) comprises calculating the channel code decoded data reliability using at least one of soft output of channel code and additional information such as CRC data received from the encoding apparatus.

17. The distributed coded video decoding method as set forth in claim 16, wherein the calculation of the channel code decoded data reliability is performed by calculating the channel code decoded data reliability using the following equation:

Bit-level coding: $q=0,1$

Symbol-level coding: $q=[0, 2^M-1]$ where M is assigned bits for q, given threshold $\xi_1$ $$1 - \max_{\forall q} P(q(i, j) | \underline{Y^n}) \leq \xi_1 \to Confiedence[\hat{X}(i, j)] = 1 \to \text{no error}$$

$$1 - \max_{\forall q} P(q(i, j) | \underline{Y^n}) > \xi_1 \to Confiedence[\hat{X}(i, j)] = 0 \to \text{error}$$

wherein $Y^n$ is side information for each block of length n, $\hat{X}i(i,j)$ is a pixel at location (i,j) within the reconstructed WZ picture, q(i,j) is a quantization symbol of $\hat{X}(i,j)$ or some bits of the value, and $\xi_1$ is a threshold value that is used as a reference for estimating the reliability of the decoded data.

18. The distributed coded video decoding method as set forth in claim 15, wherein the step (f) by the video correction unit comprises measuring the reconstructed current WZ picture reliability using at least one of spatial similarity between pixels within the reconstructed current WZ picture and temporal similarity between a pixel of the WZ picture and at least one corresponding pixel in the side information, key pictures and previous WZ pictures.

19. The distributed coded video decoding method as set forth in claim 18, wherein the measurement of the reconstructed current WZ picture reliability is performed by measuring the reconstructed current WZ picture reliability by measuring the spatial similarity between the pixels with the reconstructed WZ picture using the following equation:

$$N[\hat{X}(i, j)] = \{\hat{X}(i-1, j), \hat{X}(i+1, j), \hat{X}(i, j-1), \hat{X}(i, j+1)\}$$

$$\Delta_{max} = \hat{X}(i, j) - \max N[\hat{X}(i, j)], \quad \Delta_{min} = \min N[\hat{X}(i, j)] - \hat{X}(i, j)$$

$$\Delta = \frac{\Delta_{max} + |\Delta_{max}| + \Delta_{min} + |\Delta_{min}|}{2}$$

$$\Delta \leq \xi_2 \to Confiedence[\hat{X}(i, j)] = 1 \to \text{no error}$$

$$\Delta > \xi_2 \to Confiedence[\hat{X}(i, j)] = 0 \to \text{error}$$

where $\hat{X}(i,j)$ is a value of a pixel at location (i,j) within the reconstructed WZ picture, $N[\hat{X}(i,j)]$ are values of spatially neighboring pixels within the reconstructed WZ picture, and $\xi_2$ is a threshold value that is used as a reference for estimating the reconstructed current WZ picture reliability.

20. The distributed coded video decoding method as set forth in claim 18, wherein the calculation of the reliability of the reconstructed current WZ picture is performed by calculating the reliability of the reconstructed current WZ picture by measuring the temporal similarity between the pixel of the WZ picture and the side information using the following equation:

$$\Delta = |\hat{X}(i,j) - Y(i,j)|$$

$$\Delta \leq \xi_3 \rightarrow \text{Confiedence}[\hat{X}(i,j)] = 1 \rightarrow \text{no error}$$

$$\Delta > \xi_3 \rightarrow \text{Confiedence}[\hat{X}(i,j)] = 0 \rightarrow \text{error} \qquad \text{[Equation 3]}$$

wherein Y(i,j) is a pixel value at location (i,j) within the side information, and $\xi_3$ is a threshold value that is used as a reference for estimating the reliability of the reconstructed current WZ picture.

21. The distributed coded video decoding method as set forth in claim 15, wherein the determination of whether to correct of the step (g) by the video correction unit is performed using at least one of a method of determining whether to correct using a preset condition and a method of correcting the reconstructed current WZ picture, calculating corresponding reliability, and determining whether to correct.

22. The distributed coded video decoding method as set forth in claim 15, wherein the determination of the correction unit of the step (g) by the video correction unit is performed by determining to correct a picture for one of each pixel, each block and entire video.

23. The distributed coded video decoding method as set forth in claim 15, wherein the step (h) by the video correction unit comprises:
   a spatial candidate estimation step of estimating a spatial candidate value based on spatial similarity between a correction target pixel and neighboring pixels thereof;
   a temporal candidate estimation step of estimating a temporal candidate value based on temporal similarity between a correction target pixel and a corresponding pixel within at least one of the reconstructed key picture, the previous WZ picture and the side information; and
   a final correction step of correcting the correction target pixel using at least one of the temporal and spatial candidates.

24. The distributed coded video decoding method as set forth in claim 23, wherein the spatial candidate estimation step comprises estimating the spatial candidate value to be a median value among the correction target pixel and its neighboring pixels.

25. The distributed coded video decoding method as set forth in claim 23, wherein the temporal candidate estimation step comprises estimating the temporal candidate value through motion estimation for the reconstructed current WZ picture using at least one of the reconstructed key picture, the previous WZ picture and the side information as reference video.

26. The distributed coded video decoding method as set forth in claim 23, wherein the final correction step comprises selectively correcting all or part of pixels to be corrected based on the reliability of the reconstructed current WZ picture thereof.

* * * * *